United States Patent [19]

Terashima et al.

[11] Patent Number: 5,423,898
[45] Date of Patent: Jun. 13, 1995

[54] METHOD OF LOWERING AND RAISING A OPTICAL FIBER PREFORM IN A SINTERING FURNACE

[75] Inventors: Masami Terashima; Hiroyuki Koide; Hideo Hirasawa; Kazuhiro Hamaguchi, all of Gunma, Japan

[73] Assignee: Shin-Etsu Chemical Co., Ltd., Tokyo, Japan

[21] Appl. No.: 207,541

[22] Filed: Mar. 7, 1994

[30] Foreign Application Priority Data

Mar. 18, 1993 [JP] Japan ................. 5-058591

[51] Int. Cl.⁶ ........................................... C03B 37/018
[52] U.S. Cl. ...................... 65/381; 65/385; 65/427; 65/260; 414/210
[58] Field of Search ............... 65/414, 427, 381, 385, 65/540, 260; 414/22.68, 22.63, 210, 24, 14

[56] References Cited

U.S. PATENT DOCUMENTS

| | | | |
|---|---|---|---|
| 1,213,285 | 1/1917 | Slingluff | 414/24 |
| 3,981,369 | 9/1976 | Bokenkamp | 414/22.68 |
| 4,350,569 | 9/1982 | Helgeland | 414/210 |
| 4,738,321 | 4/1988 | Olivier | 414/22.68 |
| 4,801,324 | 1/1989 | Hyland | 65/381 |
| 4,906,268 | 3/1990 | Lane | 65/427 |
| 5,221,309 | 6/1993 | Kyoto | 65/427 |

Primary Examiner—W. Gary Jones
Assistant Examiner—John Hoffmann
Attorney, Agent, or Firm—McAulay Fisher Nissen Goldberg & Kiel

[57] ABSTRACT

An improvement is proposed in the apparatus and method for the preparation of a transparent silica glass preform as a precursor of optical fibers by sintering and vitrifying a porous silica glass preform in a sintering furnace as vertically suspended at the lower end of a suspender rod rotated by a carriage. Different from the conventional process in which the porous preform is lowered into the sintering furnace and the transparent preform after vitrification is pulled up out of the furnace as suspended at the lower end of the suspender rod throughout, a separate vertical driving device is provided along with a horizontal driving device for the carriage so that the effective up-and-down stroke of the carriage can be greatly reduced and the apparatus as a whole can be by far more compact contributing to the reduction of the manufacturing costs of the optical fibers of silica glass.

1 Claim, 3 Drawing Sheets

METHOD OF LOWERING AND RAISING A OPTICAL FIBER PREFORM IN A SINTERING FURNACE

BACKGROUND OF THE INVENTION

The present invention relates to a method and apparatus for the preparation of a silica glass preform as a precursor of optical fibers. More particularly, the invention relates to a method and apparatus by which a large-size porous silica glass preform can be sintered and vitrified into a transparent silica glass preform with good efficiency.

While a transparent silica glass preform as a precursor of silica glass optical fibers is prepared by sintering and vitrification of a porous silica glass preform at a temperature of 1300° to 1500° C., such a porous silica glass preform is produced mainly by the so-called VAD (vapor-phase axial deposition) method, in which a gaseous feed of a volatile silicon-containing compound such as silicon tetrachloride with optional admixture of a dopant such as germanium tetrachloride is subjected to flame hydrolysis in an oxyhydrogen flame to form fine particles of silica which are deposited on the carrier or a vertically held seed rod made from fused silica glass and connected to the lower end of a suspender rod in the form of a porous silica body which grows in the axial or vertical direction as the deposition of the silica particles proceeds to give an elongated porous rod of silica glass to be subsequently subjected to sintering and vitrification in a vertical tubular sintering furnace to give a transparent silica glass preform. This sintering process is carried out by gradually lowering the porous silica glass rod suspended at the lower end of the vertical suspender rod through the seed rod under rotation into the sintering furnace where the porous body is sintered and vitrified followed by pulling-up of the thus vitrified glass body above the sintering furnace. Namely, an apparatus is indispensable in the sintering process of a porous silica glass rod into a transparent silica glass preform for lowering an elongated porous silica glass rod as vertically suspended into the sintering furnace and pulling up the vitrified body out of the sintering furnace.

In order to comply with the rapidly growing demand for optical fibers of silica glass in recent years, the porous silica glass preform in the form of a rod prepared by the above described method is also required to have an increasingly large size having a length of, for example, 2000 mm or even longer as prepared in a reactor furnace for the flame hydrolysis of a volatile silicon compound. Assuming that the porous silica glass body in the form of a rod has a length of 2000 mm as formed in the reactor furnace and the sintered and vitrified silica glass preform to be pulled up from the sintering furnace has a length of 1000 mm, the suspender rod to suspend the porous body at the lower end thereof must have a length of 2500 mm so that the apparatus for lowering the porous body into the sintering furnace and pulling up the sintered body therefrom must have an effective stroke of at least 4800 mm and the overall height of the sintering apparatus sometimes exceeds 10 meters.

It may be too much to say that an apparatus having a so large height is accompanied by several disadvantages. Firstly, the cost for the construction of such a large apparatus is necessarily very high as compared with the cost for a more compact apparatus. Secondly, a serious problem is caused relative to the accuracy of the rotating movement of the suspender rod which is rotated necessarily with eccentricity more or less when the length thereof is great since the suspender rod is held by a carriage only at the upper part. Needless to say, eccentric rotation of the suspender rod seriously affects the uniformity of the sintered and vitrified silica glass preform. Thirdly, the plant house in which the apparatus is installed must be high enough as a matter of course which is constructed with a very large construction investment and requires a large amount of maintenance costs. In sum, the height of the apparatus for lowering a suspended porous silica glass body into the sintering furnace and pulling up the same after vitrification is one of the important determinant factors of the costs for the manufacture of optical fibers because of the large investment therefor and the limitation in the improvement of the productivity.

SUMMARY OF THE INVENTION

The present invention accordingly has an object to provide a novel and improved apparatus and a method for the preparation of a transparent silica glass preform as a precursor of optical fibers by sintering and vitrifying a porous silica glass rod in a sintering furnace or, in particular, by lowering a porous silica glass rod suspended at the lower end of a vertical suspender rod into a sintering furnace and pulling up the preform after sintering and vitrification out of the furnace.

Thus, the apparatus of the present invention, which is an apparatus for lowering a porous silica glass preform in the form of a rod as suspended at the lower end of a vertical suspender rod into a sintering furnace and pulling up the transparent silica glass preform after sintering and vitrification above the sintering furnace, comprises:
 (a) a carriage to hold the suspender rod in a vertical disposition and rotating the same;
 (b) a means to drive the carriage in the vertical direction;
 (c) a means to drive the carriage in the horizontal direction;
 (d) a means for holding the glass preform.

In particular, it is preferable that the means for holding the glass preform is built in the carriage per se.

Further, the method of the present invention for the preparation of a transparent silica glass preform by sintering and vitrifying a porous silica glass preform in the form of a rod as suspended at the lower end of a suspender rod through a seed rod therebetween in a sintering furnace comprises the steps of:
 (A1) suspending the porous silica glass preform by clamping at the seed rod with a vertical driving device;
 (A2) lowering the suspended porous silica glass preform by means of the vertical driving device to such a height that the seed rod is just above the sintering furnace;
 (A3) holding the porous silica glass preform by clamping at the seed rod with a holding device;
 (A4) unclamping the vertical driving device from the seed rod;
 (B1) moving a carriage vertically holding a suspender rod in the horizontal direction to just above the porous silica glass preform held above the sintering furnace;
 (B2) connecting the suspender rod to the seed rod;

(B3) disconnecting the holding device from the seed rod;

(C) lowering the porous silica glass preform under rotation into the sintering furnace in which the porous silica glass preform is sintered and vitrified into a transparent silica glass preform;

(D) pulling up the transparent silica glass preform out of the sintering furnace;

(E1) holding the transparent silica glass preform by clamping at the seed rod with the holding device;

(E2) disconnecting the suspender rod from the seed rod;

(F) moving the carriage holding the suspender rod in the horizontal direction away from above the silica glass preform;

(G1) connecting the seed rod to the vertical driving device;

(G2) disconnecting the holding device from the seed rod; and (G3) pulling up the transparent silica glass preform to such a height that the lower end of the preform is above the upper end of the sintering furnace.

DETAILED DESCRIPTION OF THE PREFERRED EMBODIMENTS

Figure 3:
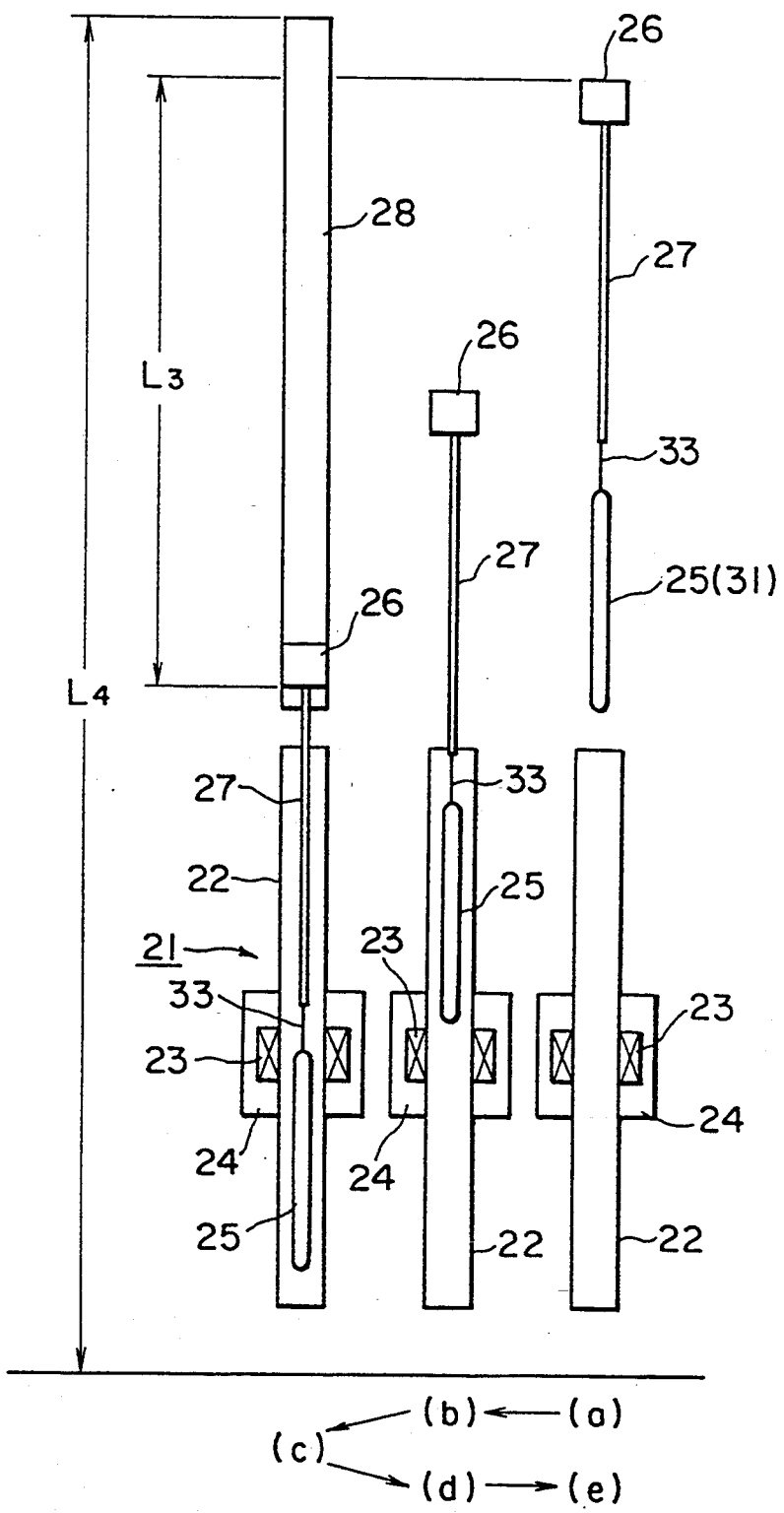
FIG. 3 is a schematic illustration of a conventional apparatus and method showing the height relationship of the parts.

The conventional apparatus and method for the preparation of a silica glass preform by the sintering and vitrification of a porous body are described by making reference to FIG. 3. As is illustrated in (a) of FIG. 3, a porous silica glass body 31 is suspended by connecting the seed rod 33 to the lower end of a suspender rod 27 rotatable by means of the carriage 26 and, as is shown by (b) of the figure, gradually lowered into a furnace tube 22 of a sintering furnace 21 and heated there at 1300° to 1500° C. by means of the heaters 23 so as to be dehydrated and vitrified into a transparent silica glass preform 25 as is shown in (c) of the figure. Thereafter, the thus formed transparent silica glass preform 25 is pulled up by upwardly moving the carriage 26 until the lower end of the preform 25 is at a height above the upper end of the furnace tube 22 as is shown by (d) and (e) of the figure.

When a silica glass preform 25 having a length of 1000 mm is desired, for example, the porous silica glass body 31 before vitrification must have a length of about 2000 mm so that the suspender rod 27 to suspend the porous body 31 at the lower end thereof must have a length of about 2500 mm in order to safely lower the porous body 31 into the furnace 21 and pull up the glass body 25 after vitrification out of the furnace 21 as is understood from FIG. 3. Accordingly, the carriage 26 holding the suspender rod 27 must be moved up and down with a effective vertical stroke of 4800 mm so that the overall height of the apparatus is as large as 10800 mm or even larger. The disadvantages accompanying such a tall apparatus are discussed before.

Figure 1:
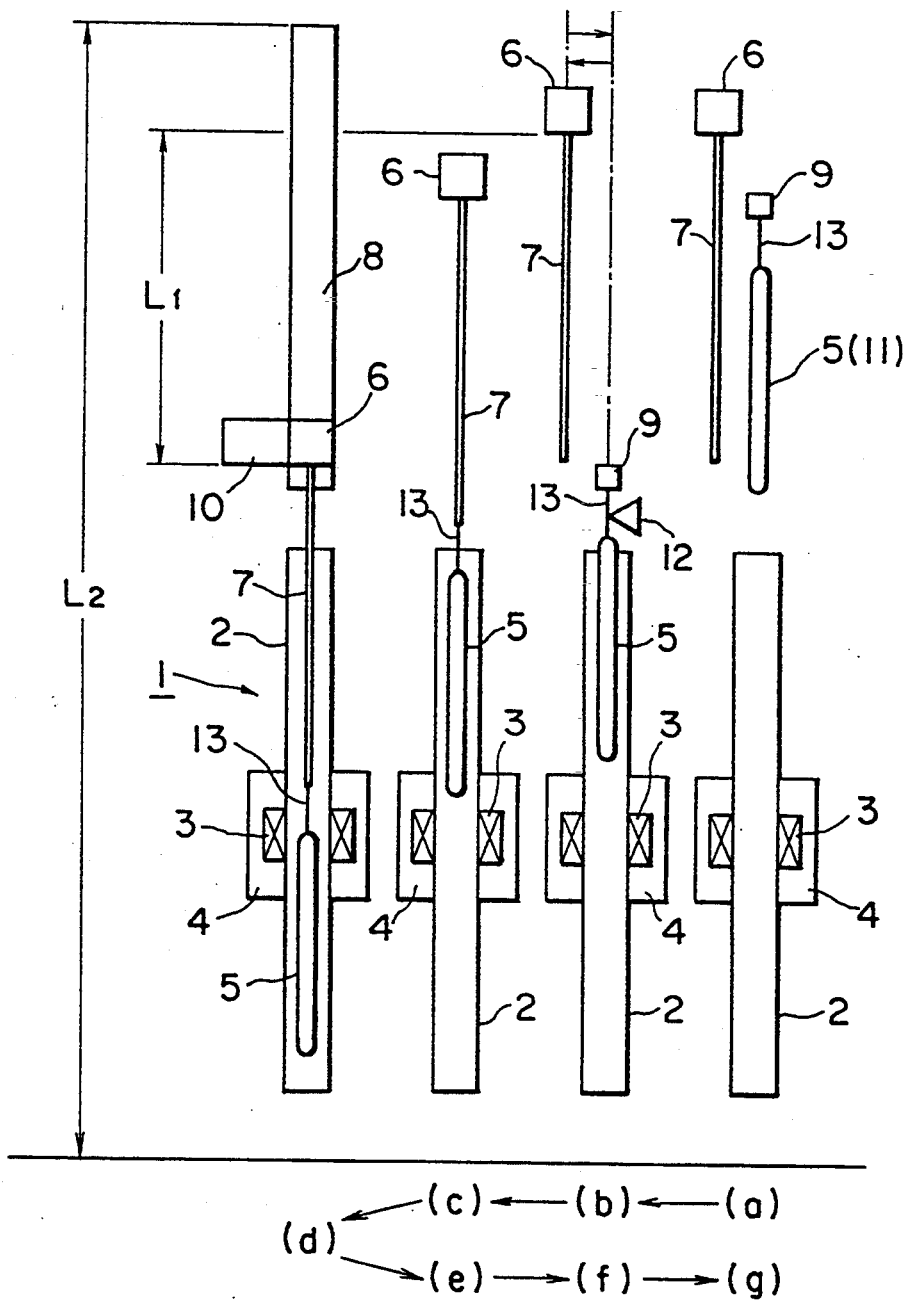
FIG. 1 is a schematic illustration of the inventive apparatus and method in an embodiment showing the height relationship of the parts.

In the apparatus and method of the present invention, the carriage which suspends the suspender rod is provided with a device to move in the horizontal direction. FIG. 1 is a schematic illustration of the inventive apparatus and method. As is shown in (a) of FIG. 1, a porous silica glass body 11 is first connected, above the sintering furnace 1, to a vertical driving device 9. The suspender rod 7 and the carriage 6 are connected together aside of the porous glass body 11.

As is shown in (b) of FIG. 1, in the next place, the porous glass body 11 is lowered by means of the vertical driving device 9 to enter the furnace tube 2 and the porous glass body 11 is temporarily held by the holding device 12 by clamping at the seed rod 13 of the porous body 11 followed by the removal of the vertical driving device 9. Thereafter, the carriage 6 and the suspender rod 7 are moved horizontally by means of the horizontal driving device 10 to just above the porous glass body 11 and the suspender rod 7 is connected at the lower end thereof to the seed rod 13 to complete setting of the porous glass body 11 for sintering in the sintering furnace 1 as is shown by (c) of FIG. 1.

As is shown in (d) of FIG. 1, the sintering furnace 1 consists of a furnace body 4 and a furnace tube 2 surrounded and heated at 1300° to 1500° C. by an electric heater 3. The porous body 11 is gradually lowered into the furnace tube 2 so that dehydration and vitrification of the porous body 11 proceed from the lower part of the porous body 11 to reach the upper end thereof so that the porous body 11 is converted in the furnace 1 into a transparent silica glass preform 5 as suspended from the carriage 6 through the suspender rod 7 and the seed rod 13.

After completion of vitrification of the porous glass body 11 in the furnace 1, the transparent preform 5 is gradually pulled up by moving the carriage 6 along the guide 8 to such a height that the seed rod 13 appears above the upper end of the furnace tube 2 as suspended at the lower end of the suspender rod 7 connected to the carriage 6 but the body of the preform 5 is still in the furnace tube 2 as is shown by (e) of FIG. 1. Thereafter, the silica glass preform 5 is temporarily held at this height by clamping the seed rod 13 with the holding device 12 and the suspender rod 7 is disconnected from the seed rod 13 followed by moving of the suspender rod 7 and the carriage 6 by means of the horizontal driving device 10 to be removed away from above the silica glass preform 5 and connection of the seed rod 13 to a vertical driving device 9 as is shown by (f) of the figure. Subsequently, the holding device 12 is disconnected from the seed rod 13 and the glass preform 5 suspended at the lower end of the seed rod 13 is pulled up by moving the vertical driving device 9 until the glass preform 5 reaches such a height that the lower end thereof is above the upper end of the furnace tube 2 as is shown by (g) of FIG. 1 to be brought away as the finished preform product.

Figure 2:
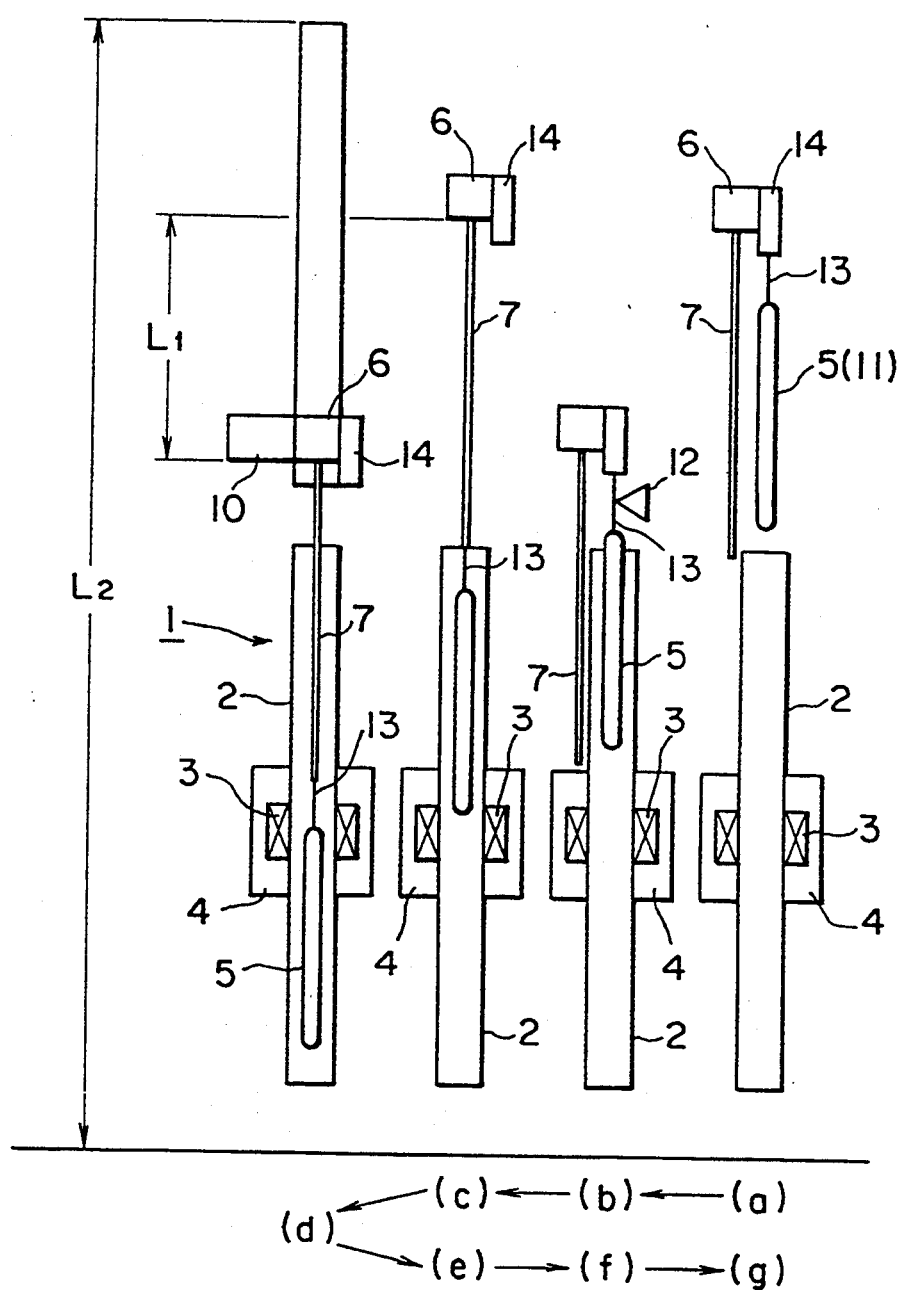
FIG. 2 is a schematic illustration of the inventive apparatus and method in a still different embodiment showing the height relationship of the parts.

FIG. 2 illustrates another embodiment of the inventive apparatus and method, in which, instead of providing a separate vertical driving device 9 shown in FIG. 1, an integral holding device 10 is provided on a side surface of the carriage 6 as is shown in FIG. 2. The porous silica glass body 11 is first suspended by the integral holding device 14 by clamping at the seed rod 13 as is shown by (a) of FIG. 2 and brought to just above the sintering furnace 1 by means of the horizontal driving device 10 of the carriage 6. The porous silica glass preform 11 is then lowered into the furnace tube 2, where the seed rod 13 is held temporarily by clamping with a holding device 12 as is shown by (b) of the figure and disconnected from the integral holding device 14. Thereafter, the carriage 6 holding the suspender rod 7 is moved upwardly and brought to just above the porous body 11 so that the lower end of the suspender rod 7 can be connected to the seed rod 13 as is shown by (c) of the figure followed by gradual lowering of the porous body 11 into the sintering zone of the sintering furnace 1 where the porous body 11 is sintered and vitrified into a transparent silica glass preform 5 as is shown by (d) of the figure. The thus obtained preform 5 is taken out of the sintering furnace 1 by being pulled up as is shown by (d), (e), (f) and (g) of FIG. 2.

In the following, the apparatus and method of the invention are described in more detail by way of examples.

EXAMPLE 1

The apparatus used in this example was that illustrated in FIG. 1 and the furnace tube 2 of the sintering furnace 1, which was made from fused silica glass, had an inner diameter of 200 mm and a length of 4500 mm. As is shown in (a) of FIG. 1, a porous silica glass preform 11 having a diameter of 150 mm and a length of 2000 mm was connected to a vertical driving device 9 at the seed rod 13 and the porous preform 11 was lowered, as is shown in (b) of FIG. 1, into the furnace tube 2 to such a height that the seed rod 13 still appeared above the upper end of the furnace tube 2. After holding the porous preform 11 by clamping the seed rod 13 with a holding device 12 and disconnection of the vertical driving device 9 from the seed rod 13, the porous preform 11 was suspended by connecting the seed rod 13 to the lower end of the suspender rod 7 of 2500 mm length rotated by the carriage 6 which had been moved by the horizontal driving device 10 to just above the porous preform 11 followed by unclamping of the holding device 12 and gradual lowering of the porous preform 11 into the furnace tube 2 at a rate of 10 mm/minute as is shown by (c) of FIG. 1 so that the porous preform 11 was sintered and vitrified as it passed the heating zone of the furnace body 4 kept at a temperature of 1500° C. by means of the heaters 3 as is shown by (d) of FIG. 1 thus to convert the porous preform 11 into a transparent silica glass preform 5 having a diameter of 100 mm and a length of 1000 mm.

The thus obtained transparent preform 5 as suspended from the suspender rod 7 was pulled up as is shown by (e) of FIG. 1 by upwardly moving the carriage 6 along the guide 8 to such a height that the seed rod 13 appeared above the upper end of the furnace tube 2. Thereafter, the preform 5 was held by clamping at the seed rod 13 with the holding device 12 followed by disconnection of the seed rod 13 from the suspender rod 7 which was removed away from above the preform 5 by horizontally moving the carriage 6 by means of the horizontal driving device 10 as is shown by (f) of FIG. 1. In the next place, the seed rod 13 was connected to the vertical driving device 9 followed by unclamping of the holding device 12 from the seed rod 13 and the preform 5 was further pulled up by means of the vertical driving device 9 as is shown by (g) of FIG. 1 to such a height that the lower end of the preform 5 was above the upper end of the furnace tube 2.

The effective stroke $L_1$ of the lowering and pulling-up apparatus used above was 2600 mm and the overall height $L_2$ of the sintering apparatus was 7300 mm.

EXAMPLE 2

The apparatus used here was that illustrated in FIG. 2, in which an integral holding device 14 was provided side-by-side to the carriage 6 so that, different from the embodiment illustrated in FIG. 1, the porous silica glass body 11 as well as the vitrified silica glass preform 5 could be held by means of the integral holding device 14 and carried by the carriage 6 instead of the vertical driving device 9 in FIG. 1.

COMPARATIVE EXAMPLE

The apparatus used here was that illustrated in FIG. 3. In this case, the porous preform 31 having the same dimensions as in Example 1 was first suspended by connecting the seed rod 33 to the lower end of the suspender rod 27 held by the carriage 26 and lowered into the furnace tube 22 by downwardly moving the carriage 26 along the guide 28 as is shown by (a), (b) and (c) in FIG. 3 to be sintered and vitrified there into a transparent preform 25 which was taken out of the sintering furnace 21 by pulling up as suspended from the carriage 26 as is shown by (c), (d) and (e) of the figure. The effective up-and-down stroke of the carriage 26, $L_3$, was 4800 mm and the overall height, $L_4$, of the apparatus was as large as 10800 mm.

What is claimed is:

1. A method for the preparation of a transparent silica glass preform by sintering and vitrifying a porous silica glass preform in the form of a rod suspended at the lower end of a suspender rod through a seed rod therebetween in a sintering furnace which comprises the steps of:
   - (A1) suspending the porous silica glass preform by clamping the seed rod with a vertical driving device;
   - (A2) lowering the suspended porous silica glass preform by means of the vertical driving device to such a height that the seed rod is above the sintering furnace;
   - (A3) holding the porous silica glass preform by clamping the seed rod with a holding device;
   - (A4) unclamping the vertical driving device from the seed rod;
   - (B1) horizontally moving a carriage holding a suspender rod to a position above the porous silica glass preform held above the sintering furnace;
   - (B2) connecting the suspender rod to the seed rod;
   - (B3) disconnecting the holding device from the seed rod;
   - (C) simultaneously rotating and lowering the porous silica glass preform into the sintering furnace in which the porous silica glass preform is sintered and vitrified into a transparent silica glass preform;
   - (D) pulling up the transparent silica glass preform out of the sintering furnace;
   - (E1) holding the transparent silica glass preform by clamping the seed rod with the holding device;
   - (E2) disconnecting the suspender rod from the seed rod;
   - (F) moving the carriage holding the suspender rod in the horizontal direction away from the silica glass preform;
   - (G1) connecting the seed rod to the vertical driving device;
   - (G2) disconnecting the holding device from the seed rod; and
   - (G3) pulling up the transparent silica glass preform to such a height that the lower end of the preform is above the upper end of the sintering furnace.

* * * * *